US009008954B2

(12) United States Patent
Miller et al.

(10) Patent No.: US 9,008,954 B2
(45) Date of Patent: Apr. 14, 2015

(54) PREDICTING IMPACT OF A TRAFFIC INCIDENT ON A ROAD NETWORK

(75) Inventors: Mahalia Katherine Miller, Palo Alto, CA (US); Chetan Kumar Gupta, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 13/460,230

(22) Filed: Apr. 30, 2012

(65) Prior Publication Data

US 2013/0289865 A1 Oct. 31, 2013

(51) Int. Cl.

| | |
|---|---|
| ***G06G 7/76*** | (2006.01) |
| ***G06G 7/78*** | (2006.01) |
| ***G06F 19/00*** | (2011.01) |
| ***G08G 1/01*** | (2006.01) |

(52) U.S. Cl.
CPC .................................... *G08G 1/0104* (2013.01)

(58) Field of Classification Search
USPC .......................................... 701/119, 117, 118
See application file for complete search history.

(56) References Cited

U.S. PATENT DOCUMENTS

| | | | | |
|---|---|---|---|---|
| 6,092,020 | A * | 7/2000 | Fastenrath et al. | 701/119 |
| 7,508,321 | B2 * | 3/2009 | Gueziec et al. | 340/905 |
| 2008/0045242 | A1 * | 2/2008 | Dekock et al. | 455/456.2 |
| 2009/0024308 | A1 * | 1/2009 | Jung | 701/117 |
| 2009/0138195 | A1 * | 5/2009 | Pemble et al. | 701/211 |
| 2009/0177373 | A1 * | 7/2009 | Groenhuijzen et al. | 701/117 |
| 2010/0106603 | A1 | 4/2010 | Dey et al. | |
| 2011/0112747 | A1 * | 5/2011 | Downs et al. | 701/118 |
| 2011/0122797 | A1 * | 5/2011 | Sheha et al. | 370/254 |
| 2011/0173015 | A1 * | 7/2011 | Chapman et al. | 705/1.1 |
| 2011/0202266 | A1 * | 8/2011 | Downs et al. | 701/119 |
| 2012/0150425 | A1 * | 6/2012 | Chapman et al. | 701/119 |

* cited by examiner

*Primary Examiner* — Fadey Jabr
*Assistant Examiner* — Yazan A Soofi
(74) *Attorney, Agent, or Firm* — Pearl Cohen Zedek Latzer LLP

(57) ABSTRACT

A method and system for predicting impact of traffic incidents on a road network by using a classification scheme to identify a known impact classes associated with captured traffic data.

20 Claims, 5 Drawing Sheets

PREDICTING IMPACT OF A TRAFFIC INCIDENT ON A ROAD NETWORK

BACKGROUND

The present invention relates generally to intelligent traffic management, and more specifically to predicting impact of traffic incident on a road network.

The impact areas and time duration of traffic incidents have been predicted in the past on the basis of manual observation of the number of vehicles and injuries involved, or using automated means, predicting the impact area as it pertains to the particular network segment on which the incident occurred.

BRIEF DESCRIPTION OF THE DRAWINGS

The subject matter regarded as the invention is particularly pointed out and distinctly claimed in the concluding portion of the specification. The features, method of operation, primary components, and advantages of the present traffic management system may best be understood by reference to the following detailed description and accompanying drawings in which:

DETAILED DESCRIPTION

Figure 1:
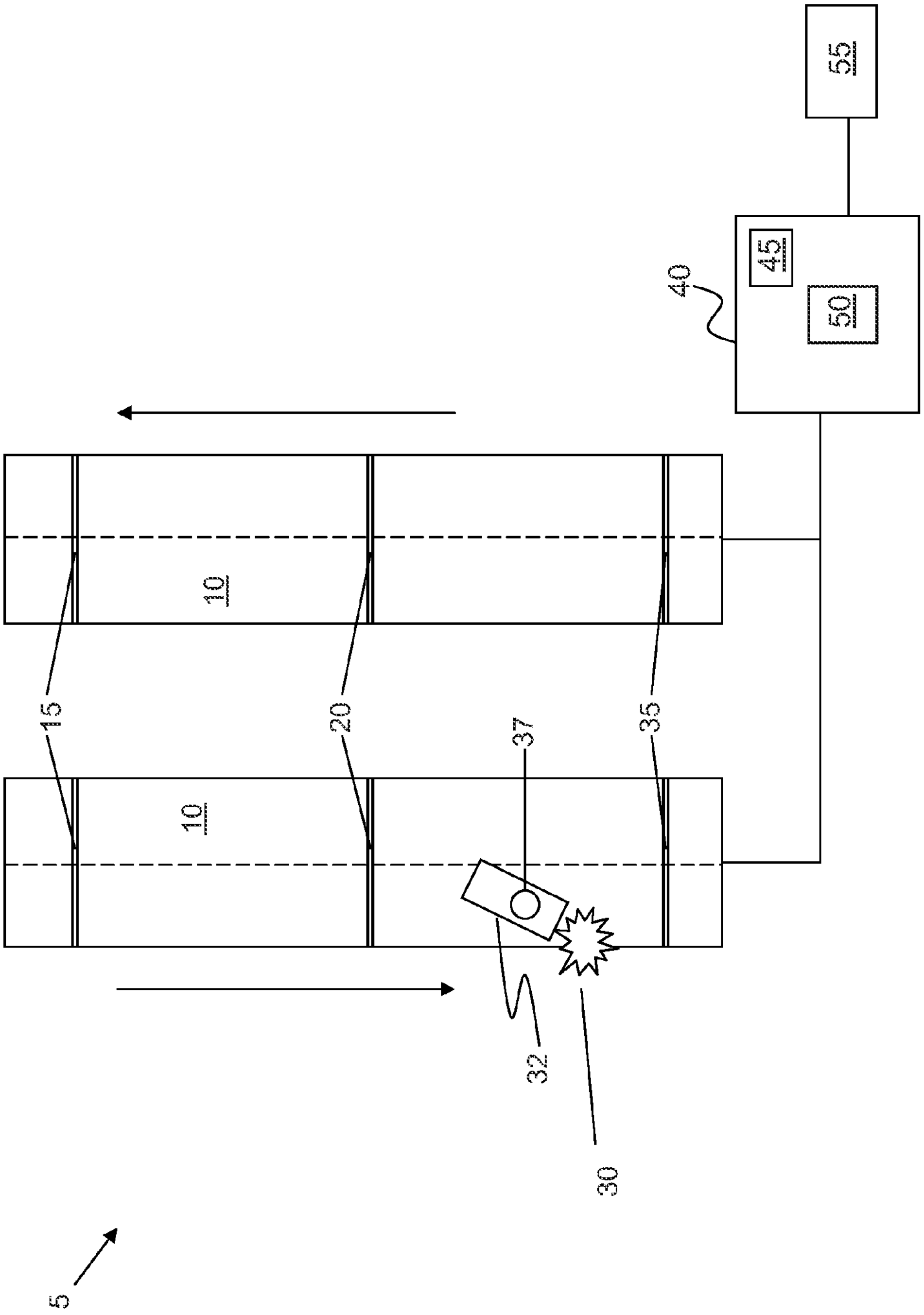
FIG. 1 is a schematic view of an example of a system for predicting impact of a traffic incident having data-capture devices configured to capture traffic-flow data that are linked to a computer system, according to an example of a traffic management system.

Following is a description of an example of a system for predicting, impact class of traffic incidents on road segments of a road network.

Generally speaking, examples of the system include data-capture devices linked to a computerized processing unit and are configured to capture traffic data indicative of traffic conditions and may be used to build a data base relating to traffic incidents and their associated impacts for use by machine learning models to construct a predictive mode or classification scheme. Furthermore, captured traffic data may be used to determine threshold traffic-flow velocities indicative of recurrent traffic-flow velocities associated with incident-free traffic to be used when the system of predicting impact is also identifying incident impact.

Quantifying overall traffic-flow velocity for traffic is a complex process because traffic typically contains a diverse of number of vehicles traveling at various speeds changing with time and road conditions.

In more specific terms, the present examples of the system for identifying impact of a traffic incident on a road network may capture traffic data relating to individual vehicles by way of data-capture devices at data-capture times and render the traffic data into traffic-flow velocities representing the overall traffic-flow velocity at a specific data capture location and time, according to examples. The traffic-flow velocity may be derived from traffic data captured by data-capture devices configured to capture traffic data such as, inter alia, the number of vehicles passing a data capture location during a known time period, a flow occupancy (i.e. the fraction of the highway capacity filled with vehicles), or vehicular velocity.

The spatial-temporal-impact region is a dynamic region and may be defined by congested, contiguous sections of a road network. A congested state may be a condition in which the traffic-flow velocity determined from traffic data obtained at a specific data-capture device at a data capture-location and data-capture time is less than a threshold velocity associated with the same-data capture location and capture time, according to examples. The threshold velocity for each data-capture device and data-capture time may be defined as a recurrent traffic-flow velocity determined from traffic data obtained during a dedicated training period, according to examples.

Temporal expressions of impact may be measured in terms incident duration or incident delay, according to examples. Incident duration of the impact time may be measured from the reported time of the traffic incident to the time at which the traffic-flow velocities of the affected road network return to recurrent conditions. Incident delay may be calculated as a cumulative delay of all drivers affected by the incident, as will be further discussed.

Additional definitions to be used throughout the document are as follows: "Traffic incident" refers to any event that disrupts the normal flow of traffic and contributes to delay; examples include, inter alia, accidents, lane closures, curiosity slow-downs, and weather conditions.

"Recurrent traffic-flow velocity" refers to traffic-flow velocity associated with each data-capture device at data-capture times on incident free days.

"Congested state" refers to a road segment having a flow—averaged velocity less than a threshold or recurrent speed.

"Traffic-flow velocity", "v" at a data capture location "i" at time "t, or" v(i, t), refers to a flow-averaged velocity, calculated according to:

$$\frac{\sum_{k=1}^{N_l} q_k(i,t)v_k(i,t)}{\sum_{k=1}^{N_l} q_k(i,t)} \text{ wherein,}$$

"qk(i, t)" is flow rate for lane "k" in units of vehicles per hour at detector "i" at each time "t", lanes "k" vary from 1 to $N_l$, $v_k$ (i, t) is a velocity for each lane "k" at detector "i" at each time "t". It should be appreciated that $v_k$(i, t) is derived from induction loop detectors by way of example; however, vehicular velocities acquired by other means may be rendered into a flow averaged velocities by way of the above equation or other equations transforming individual velocities into an overall flow—averaged velocity.

"Upstream" refers to a direction opposing the traffic flow.

"Feature vector" refers to a feature used as a basis for a decision in machine learning models, including classification trees directed at constructing a predictive model to be used in predicting impact class from real-time, traffic data.

"Impact class" refers to divisions of impact types that may be useful in grouping ranges of impact severity.

"Impact type" refers to various impact metrics; spatial-temporal, temporal, and financial.

Turning now to the figures, FIG. 1 depicts an example of a system for predicting the impact class of a traffic incident on a road network, generally labeled 5, including road segment 10 and a plurality of stationary data-capture devices, 15, 20, and 25, disposed along road segment 10 and linked to a computing system 40.

Computing system 40 includes at least one processor 50 and output interface 45, according to examples. Stationary data-capture devices may include, for example, induction-loop sensors, cameras, radar units and mobile data-capture devices. Such mobile devices may include, for example, location-tracked mobile units 37 wirelessly linked to computing system 40 as shown in vehicle 32 involved in traffic incident 30.

In some examples, data-capture devices may be configured to capture the number of vehicles passing by at a particular time or to capture vehicular speed depending on the type of data-capture device. Computing system 40 may include an output interface 45 configured to display, transfer, or transmit traffic incident information either wirelessly or by way of hard wire to relevant parties.

A non-limiting example of calculating threshold speed from preliminary traffic-flow data captured during a training period at road location "i" at time "t", hereinafter referred to as v*(i, t), is hereinafter detailed.

Threshold speed, v*(i, t) may be computed from incident-free conditions at a particular location "i" and time "t" and may be computed separately for each weekday and weekends with the assumption that v*(i, t) is periodic with a periodicity of a day, and each weekday and weekend days follow distinct and different patterns, according to examples. Thus, each detector "i" may have 288 weekday threshold values (e.g. based on 5 minute slots for 24 hours) and an equal number of threshold speed values for the weekend.

Time histories for each detector may be annotated to mark windows of time of incident-induced congestion to facilitate calculation of incident free behavior, i.e. recurrent velocities. Initially, all detectors may be marked as incident-free at all times of the day. From this starting point, the definition of "incident free" is iteratively updated to converge to v* values. The model for threshold speeds may be trained over training period of "k" days. The training process involves iterating over the "k" days from j=1 . . . m times. The v*(i, t) after iteration" are denoted $v_j$*(i, t).

The threshold traffic-flow velocity, v*(i, t) may then be calculated as the traffic-flow velocity for each detector location at a particular time from traffic data captured on incident free days using the formula for calculating the flow-averaged velocities noted above.

Examples of the intelligent transportation management system include provisions for predicting a impact classes from traffic data augmented from police, logs or weather information services linked to system 5.

Data-capture devices, logs, information serves are collectively referred to as a data provider for the purposes of this document.

Police logs may be parsed to ascertain the incident location and other relevant incident information that can be used to construct feature vector. Examples of such information include the number of vehicles involved in the incident, their size and a variety of other features that will be further discussed. The incident location enables mapping to the closest upstream sensor on a directed graph wherein upstream is defined as the opposite direction to traffic flow since the impact of an incident typically spreads upstream, i.e. there is a back-up behind an incident.

Figure 2:
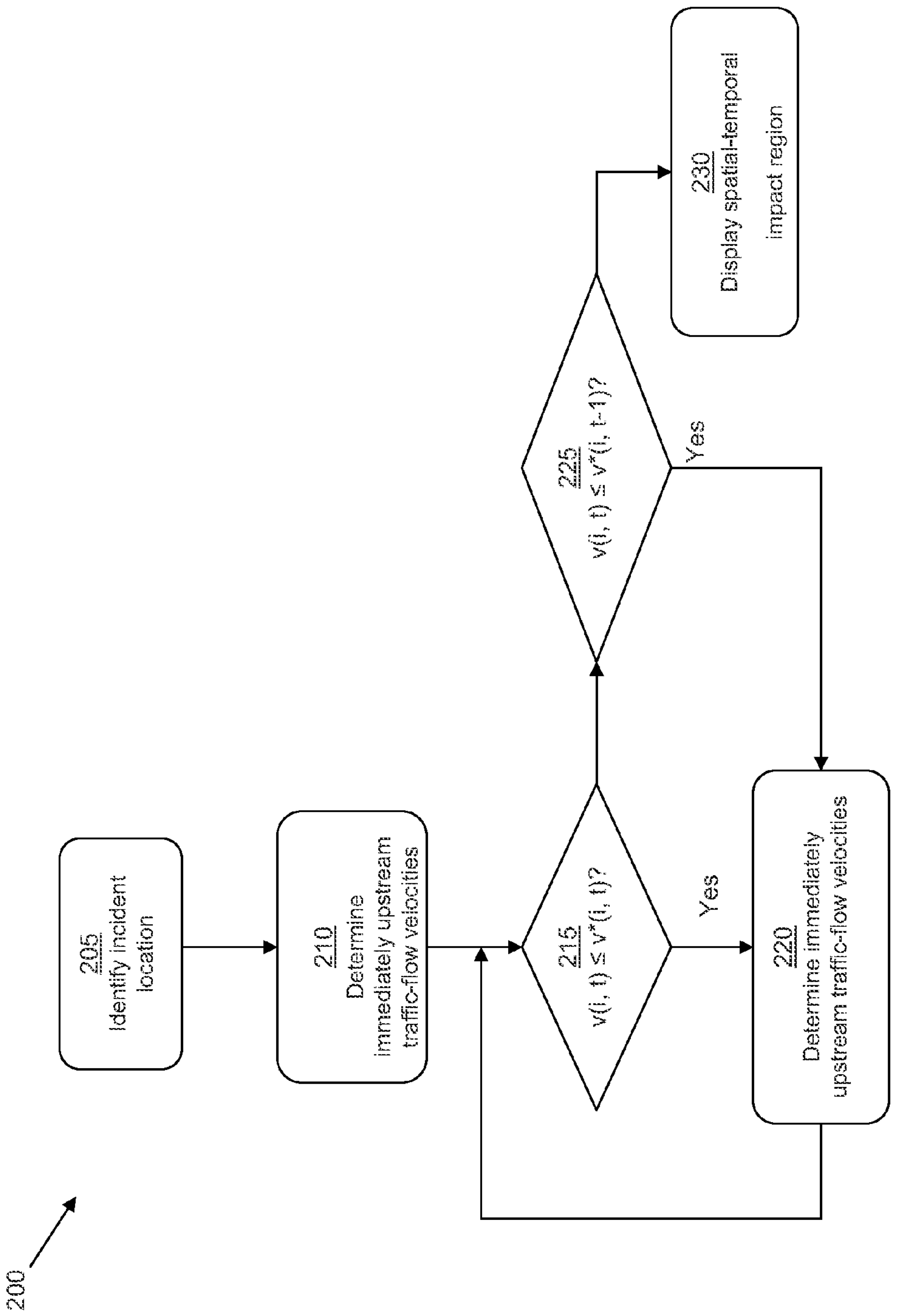
FIG. 2 is a flow chart depicting a process for identifying a spatial-temporal impact area, according to examples.

A non-limiting example of identifying the spatial-temporal impact region is hereinafter detailed in the flowchart of FIG. 2 In step 205 an incident location is identified from a police log and the nearest upstream data-capture device is also identified, by way of a directed graph or any other means, as noted above.

In step 210, the system for predicting impact classes may determine traffic-flow velocities at locations "i" upstream from the incident corresponding to data-capture devices 15, 20, and 35 of FIG. 1, according to examples. It should be appreciated that the traffic-flow velocity determination may be accomplished at processor 50 appearing in FIG. 1 or locally; at the data-capture devices when implemented as radar, for example.

In step 215, the system for predicting the spatial-temporal region may also evaluate if the current traffic-flow velocity at the data-capture device located immediately upstream from the incident is less than the corresponding recurrent traffic-flow velocity for that specific data-capture device and data-capture time. A traffic-flow velocity less than the recurrent traffic-flow velocity indicates the spatial-temporal impact area has expanded to this data-capture location. Processing continues to step 220 where the system again collects traffic data at the next, data-capture device immediately upstream and determines traffic-flow velocity. The system reiterates the evaluation of step 215 and if the traffic-flow velocity is found to be indicative of congestion at that data-capture time, the system continues to check traffic flow conditions at the next upstream data-capture device as shown in step 220.

When the traffic-flow velocity at a data-capture device exceeds the corresponding recurrent traffic-flow velocity for the corresponding data capture time, processing proceeds to step 225, where the system evaluates if the traffic-flow velocity of the previous data-capture time, (i.e. at previous time step "t−1") was less than the corresponding recurrent traffic-flow velocity. If so, this data-capture device is also added to the set of data-capture devices enclosed in the spatial-temporal impact region and the system continues to obtain traffic data at the immediately upstream data-capture device as noted in step 220.

When the evaluation of step 225 indicates that the traffic-flow velocity of the previous time step was also equal to or exceeds the corresponding recurrent traffic-flow velocity, the boundary of the spatial-temporal impact region has been identified and the system terminates its search for additional data-capture devices and displays the identified region as noted in step 230, in either numerical or graphical form. It should be appreciated that certain examples of the system for identifying spatial-temporal impact regions display the identified impact region prior to identifying the boundary.

The following equation identifies a contiguous spatial-temporal impact region A' defined by the set of sensors, "$S_t$" at time step "t" of data-capture devices "u" at location "i" and time "t" or, u((i, t):

$$St=\{\{u(i,t)\}|v(i,t)<v^*(i,t)\wedge\exists e(k,i):k\in(St\cup(St-1)\}$$

wherein "e" is the road segment between locations "k" and "i" and location "k" is immediately upstream from sensor at location "i".

The set of all data capture devices defining the spatial-temporal impact region may be described by:

$$S=\{\{u(i,t)\}|v(i,t)<v^*(i,t)\wedge v(i,t-1)<v^*(i,t-1)\wedge u(i,t-1) \text{ is in } S_{t-1}, \text{ for } t\geq 1\}+S_0$$

wherein $S_0$ is the set including only the first upstream data-capture device from the traffic incident.

Figure 3C:
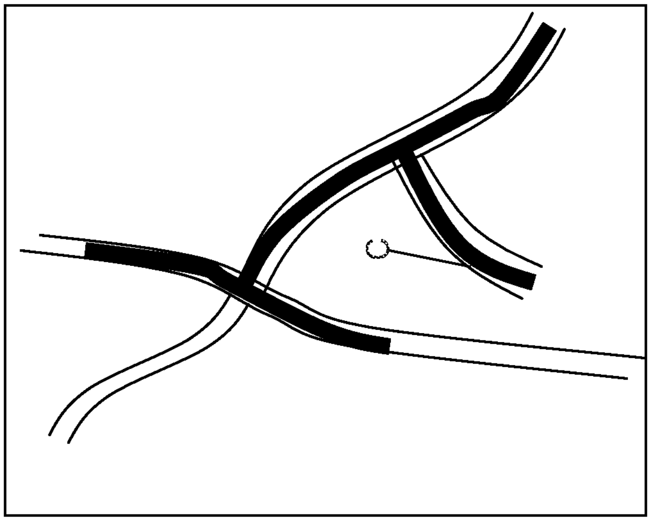
FIG. 3C is a graphical prediction of an extremely advanced stage of congestion from a traffic incident, according to examples.
Figure 3B:
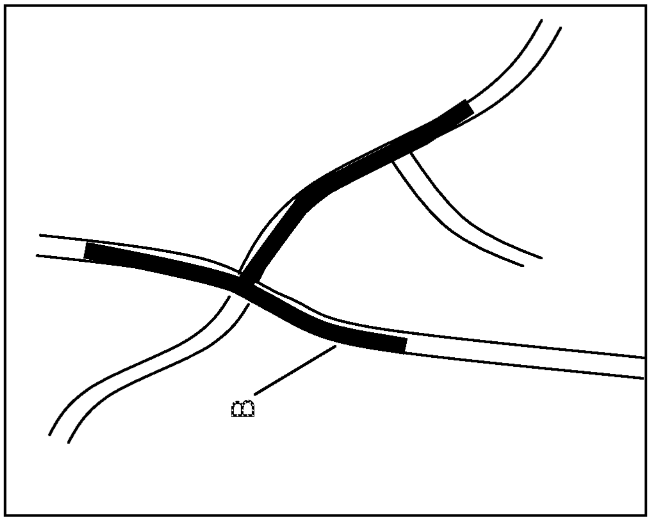
FIG. 3B is a graphical prediction of an advanced stage of congestion from a traffic incident, according to examples.
Figure 3A:
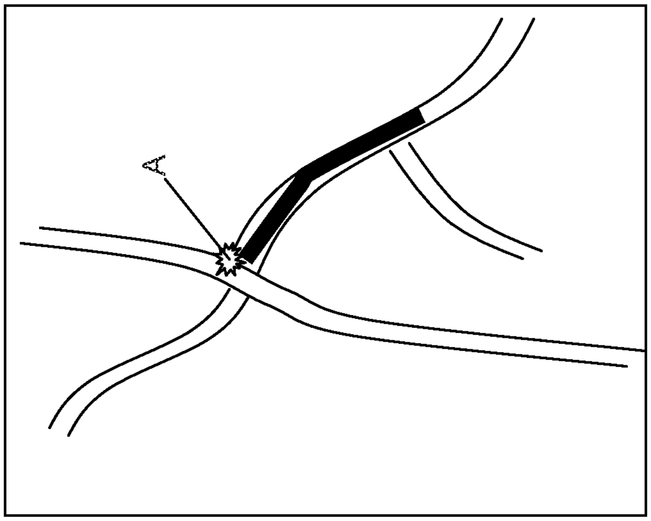
FIG. 3A is a graphical prediction of an early stage of congestion from a traffic incident, according to examples.

FIG. 3A is a graphical impact identification or prediction of a first impact class of spatial-temporal impact region of moderate congestion emanating from incident location "A", according to certain examples.

FIG. 3B is a graphical identification or prediction of a second impact class of a spatial-temporal impact region of advanced traffic congestion extending in both directions of intersecting road "B", according to certain examples.

FIG. 3C is a graphical identification or prediction of a third impact class of the spatial-temporal impact region of severe traffic congestion including feeder road "C", according to certain examples.

After determining the velocity at each data-capture device enclosed by the spatial-temporal impact region, examples of the system for predicting impact classes provide different metrics for temporal impact; such as incident delay and duration. As noted above, incident delay refers to a cumulative delay of all affected drivers. Incident delay is especially useful for calculating economic loss resulting from a traffic incident and may be estimated by multiplying the incident delay by a monetary value per time basis.

The incident delay itself may be estimated according to the following relationship of $D_{inc}$:

If v(i, t)<v*(i, t)

$$D_{inc} = \sum_{A'} \sum_{T'} l_i \times q(i, t) \times \left( \frac{1}{v(i, t)} - \frac{1}{v*(i, t)} \right)$$

$$D_{rem} = \sum_{A-A'} \sum_{T-T'} l_i \times q_i(t) \times \left( \frac{1}{v(t)} - \frac{1}{v*(i, t)} \right)$$

$$D_{rec} = \sum_{A} \sum_{T} l_i \times q(i, t) \times \left( \frac{1}{v*(i, t)} - \frac{1}{v_{ref}(t)} \right)$$

If v(i, t)≥v*(i, t )

$$D_{inc} = D_{rem} = D_{rec}$$

$$D_{rec} = \sum_{A} \sum_{T} li \times q(i, t) \times \max\left( \frac{1}{v*(i, t)} - \frac{1}{vref(t)}, 0 \right)$$

wherein, $D_{inc}$ is the "incident delay" emanating from the traffic incident. This delay type and other types of delay such as "remaining delay", $D_{rem}$, and "recurrent delay", $D_{rec}$ are measures of cumulative delays of all affected drivers. $D_{rem}$, refers to delays that cannot be accounted for by either the incident delays or the remaining delay.

Furthermore, $l_i$ refers to segment length beginning at location "i";

$q_i$ (t) refers to a vehicular flow-rate at time "t";

v(i, t) refers an traffic-flow velocity calculated as an averaged flow velocity derived from measurements at location "i" at time "t" as noted above.

v*(i, t) refers to a threshold traffic-flow velocity at location "i" at time "t";

A' refers to a spatial extent of the traffic incident;

T' refers to the temporal impact of the traffic incident, and $v_{ref}$ refers to a reference speed from which the delays are calculated. As noted above, the time exceeding the time required to travel a road segment at a reference speed is considered a delay. In non-limiting examples 60 m.ph. is chosen as the reference speed from which delays are measured.

The time delay is the time exceeding the time needed to travel a road segment when traveling at the reference speed.

A second measure of the temporal extent of a traffic incident is defined as the time period beginning from the time of the incident to the time at which traffic flow returns to recurrent flow conditions.

The incident duration may be calculated by tracking the time at which traffic-velocity flow at the data-capture devices bounding the spatial-temporal data flow return to recurrent velocities. The difference between the time at which this condition is met and the original reported incident time defines the incident duration, according to examples.

Computing system 50 of FIG. 1 may be configured to update predications of incident duration and incident delay in real time as additional traffic data is obtained.

These temporal metrics may then be displayed or transmitted to a central location by way of output device 45 of FIG. 1 where interested drivers can obtain near real-time, future-oriented predictions or historical reports or both of them.

After an incident has been identified, the system for predicting traffic incident impact may employ a machine learning model to build a model for classifying incident classes based on captured traffic flow data captured at early stages of the congestion following the incident to predict the spatial-temporal and temporal impact that can be expected, according to examples.

The system for predicting incident class may employ classical processor-implemented classification models to build the predictive model, i.e. classification scheme, for identifying a impact class associated with traffic-flow velocities generated from traffic data, according to embodiments. Furthermore, the system may continually refine the classification model as additional traffic data becomes available as the spatial-temporal impact region expands.

Such processor-implemented machine learning models include, inter alia, classification trees and K-means clustering, or any ensemble of machine learning models in which particular learning models may be user-defined or non-user-define, according to examples The system for predicting impact class may be configured to build feature vectors to be presented combining data from disparate structured and unstructured data sources, according to examples.

Such feature vectors are may be constructed by collecting traffic data from data-capture devices near the incident location by locating the closest upstream and downstream data-capture devices to a reported incident using a directed graph or other adequate means. According to examples, speed v(i, t), recurrent speed v*(i, t), and road occupancy p(i, t) may be collected from one data-capture device directly upstream and one directly downstream as shown in FIG. 1 In addition to these features, linear combinations of the data may also be calculated as traffic-flow velocity $v_{diff}$(i, t)=(v*(i, t)−v(i, t) and $v_{diff}$(j, t)−$_{diff}$ (i, t) where $v_{diff}$(j, t) is the traffic-flow velocity difference between the next two upstream data-capture devices 15, 20 of FIG. 1, according to examples. The number of highway lanes may also be used to construct a feature vector.

As previously noted, additional, disparate features may also be used to construct feature vectors. For example, unstructured police logs may be parsed to extract useful features relating to the incident type, weather data, or any event that influences traffic flow as noted above. Examples of typical incident types include, traffic hazard, collision without minor injuries, collision with major injuries involving an ambulance, natural weather hazard, lane closure, fire, collision without details, hit and run. It should be noted that any combination of data-capture locations may be may be used to construct feature vectors.

In a tiered classification model, when the model determines that the incident will last longer than time t' with high confidence, traffic data up to time t' and police logs up to time t' may be used to build a new expanded feature vector, according to examples.

In addition to building feature vectors based on data for each incident, the system for predicting may also construct feature vectors for possible pairs of incidents for use in predicting which incident will have a relatively greater impact.

After construction of the feature vectors, the system may construct a predictive model employing classification scheme from a data base of traffic data collected during traffic incidents by data-capture sensors disposed along relevant segments of a road network. After the system for predicting traffic impact has been configured evaluate traffic-flow velocities on the basis of the constructed classification scheme, the system can then predict the impact class of traffic incidents on the basis of a few minutes of obtaining traffic data from data-capture devices closest to the incident location immediately following a traffic incident, according to examples. In non-limiting examples the system is be able to predict impact class after only two minutes following the incident, according to examples.

Impact of traffic incidents include several impact types as discussed in part above; a spatial-temporal extent, a temporal extent, and an economic extent. Each type of incident impact may be divided into impact classes representing degrees of severity so that the system is able to predict a severity of each type of incident impact by classifying traffic-flow as a particular incident type with known impact, according to examples.

Following is a non-limiting table of sample impact classes:

| Spatial Temporal Impact Region (mi.) | | | Incident Duration (hrs.) | | | Incident Delay (hrs.) | | | Economic Loss ($) (Incident delay x $50/hr.) | | |
|---|---|---|---|---|---|---|---|---|---|---|---|
| 1-5 | 5+ to 15 | 15+ | <1 | 1+ to 3 | 3+ | <1000 | 1000+ to 5000 | 5000+ | <5000 | 50,000+ to 250,000 | 250,000+ |

As shown, economic loss is calculated by multiplying a monetary value per hour by the cumulative lost time of all drivers affected by the traffic incident, according to examples.

Figure 4:
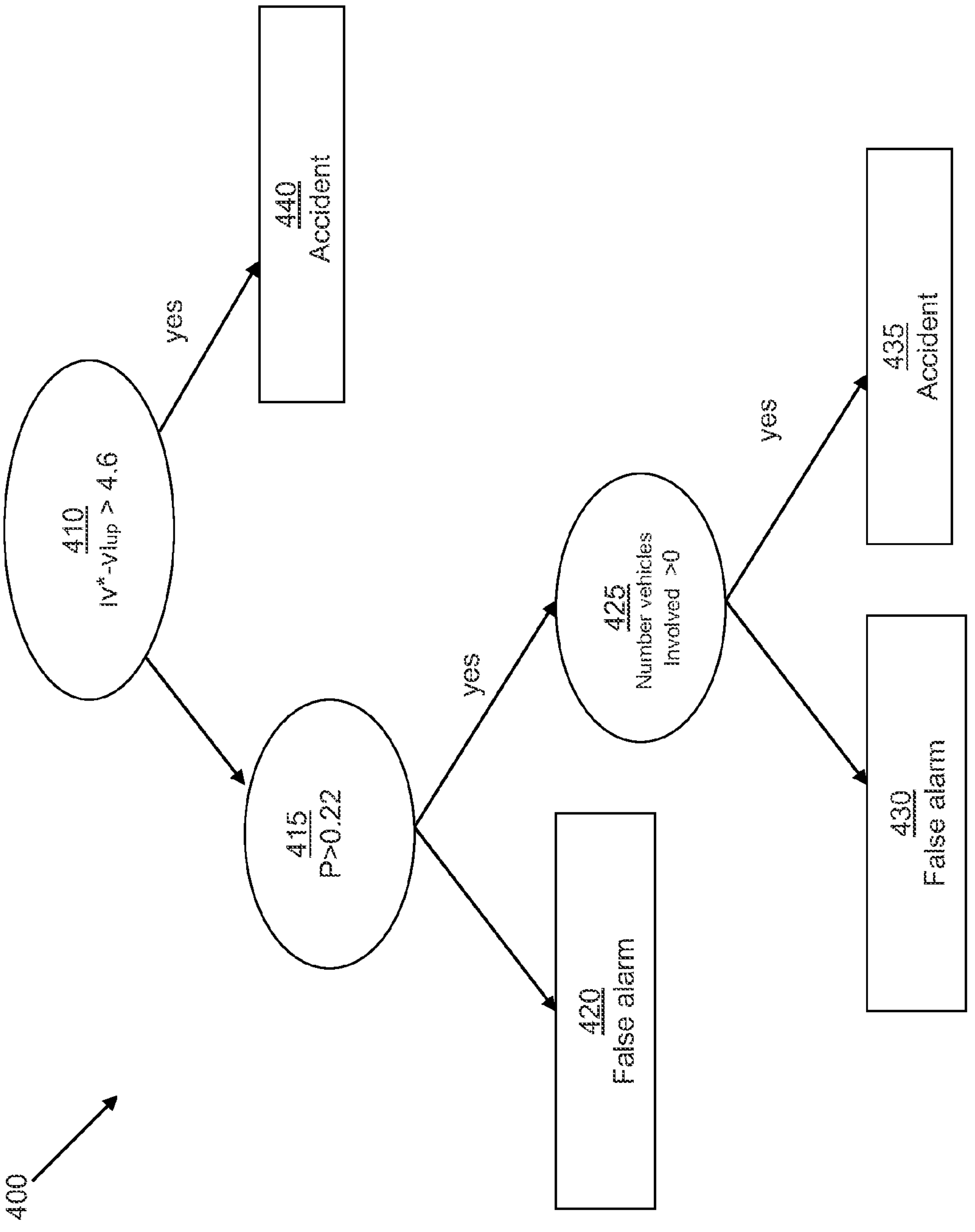
FIG. 4 is a sample classification tree for predicting a traffic incident, according to examples.

As noted above, the system for predicting incident impact may employ a predictive model constructed from machine learning models and constructed feature vectors. FIG. 4 depicts an example of a predictive model in which a classification tree, generally labeled 400, predicts whether a report of an incident corresponds to a non-negligible delay incident or a significant incident having significant traffic-flow consequences by using both disparate structured and non-structure data.

In this non-limiting example, the root node 410 of the classification tree makes a decision based on the absolute value of the difference between the measured speed and the recurrent speed at second data-capture device removed upstream from the incident location.

If the speed is significantly below the recurrent speed for that data-capture location and data-capture time of day, 4.6 in this example, the model predicts that an accident is occurring as noted at node 440. If not, the model checks how densely packed the road is at node 415, i.e. occupancy. If the road is relatively empty, e.g. less than 0.22, then the model predicts the report as a false alarm as noted in node 420. If not, the model checks to see if any police report mentioned vehicles involved within the first two minutes at node 425. If so, the model predicts that an accident is occurring as noted at node 435 and if not, the model classifies the report as a "false alarm" as noted at node 430.

Figure 5:
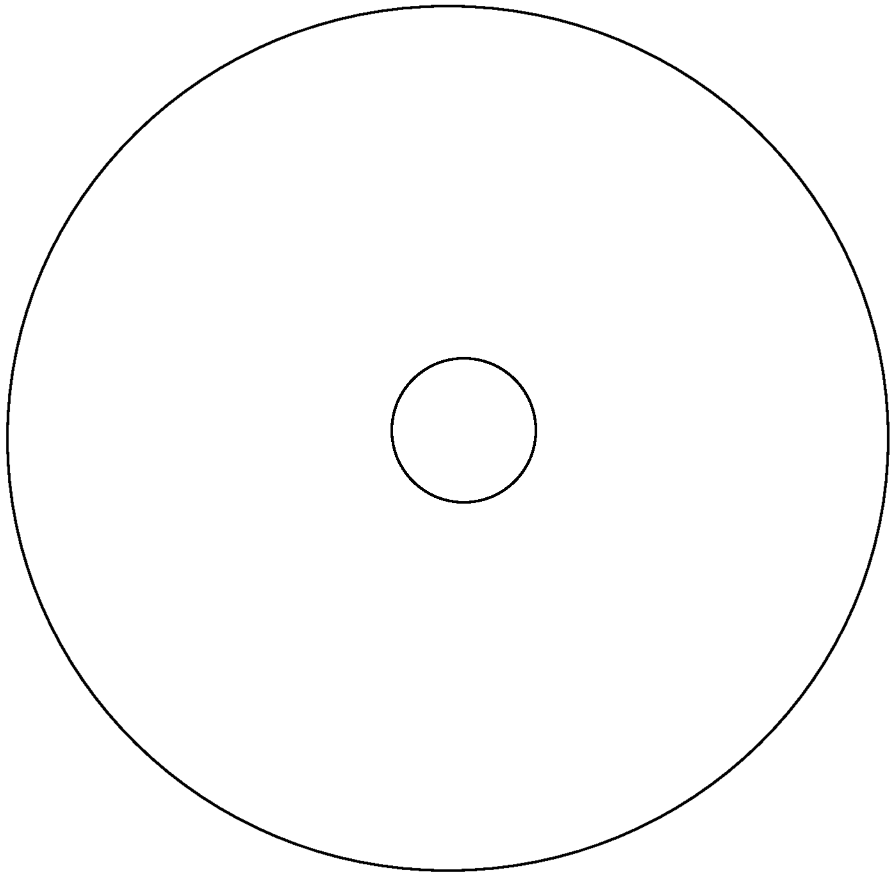
FIG. 5 is a CD ROM in which computer-executable instructions are encoded for predicting, traffic incident impact; according to examples.

FIG. 5 is a CD ROM in which computer-executable instructions are encoded for modeling spatial-temporal-impact area of traffic incidents, according to examples of the traffic management system.

It will be appreciated that for simplicity and clarity of illustration, elements shown in the figures have not necessarily been drawn to scale and reference numerals may be repeated in different figures to indicate corresponding or analogous elements.

configured to update the estimated incident duration and incident delay in real time as the boundary of the spatial-temporal impact region changes with time.

These temporal metrics may then be displayed or transmitted to a central location by way of output device 45 of FIG. 1 at which interested drivers can obtain near real-time updates together with the spatial-temporal impact as noted above.

FIG. 5 is a CD ROM in which computer-executable instructions are encoded for predicting impact class of traffic incidents, according to examples of the traffic management system.

It will be appreciated that for simplicity and clarity of illustration, elements shown in the figures have not necessarily been drawn to scale and reference numerals may be repeated in different figures to indicate corresponding or analogous elements.

What is claimed is:

1. A method for predicting impact of a traffic incident on a road network, the method comprising:
- receiving, by a processor, traffic data from at least one data provider; and
- using a processor to:
- calculate a plurality of traffic-flow velocities from the traffic data, each of the traffic-flow velocities being associated with a data-provider and a data-capture time; and
- use a classification scheme and a learning model to predict, based on the traffic data, an impact class associated with the traffic-flow velocities, in which the impact class indicates a degree of severity of an incident and includes a cumulative incident delay identified based on the traffic data.

2. The method of claim 1, wherein the processor is further configured to identify data providers having an associated traffic-flow velocity less than their associated recurrent traffic-flow velocity at the data-capture time.

3. The method of claim 1, wherein the data providers include a police log.

4. The method of claim 1, wherein the impact class includes a temporal impact class.

5. The method of claim 1, wherein the impact class includes an economic loss class.

6. The method of claim 1, further comprising calculating at least one feature vector from the traffic-flow velocity.

7. The method of claim 6, further comprising calculating at least one feature vector from traffic data obtained from a police log or weather report.

8. A system for predicting impact of a traffic incident in a road network, the system comprising:

a plurality of data-capture devices disposed along the road network, the data-capture devices configured to capture the traffic data at a data-capture time;

a processor configured to:

calculate a plurality of traffic-flow velocities from the traffic data, each of the traffic-flow velocities being associated with a data-capture time and one of the traffic-data capture devices, use a classification scheme and a learning model to predict, based on the traffic data, an impact class associated with the traffic-flow velocities, in which an impact class indicates a degree of severity of an incident and a cumulative incident delay associated with the traffic-flow velocities.

9. The system of claim 8, wherein each of the traffic data-capture devices is selected from the group consisting of a loop induction sensor, an image capture device, and a radar device.

10. The system of claim 8, wherein the impact class includes an impact delay class.

11. The system of claim 8, wherein the impact class includes an economic loss class, in which the economic loss class is calculated based on a cumulative lost time of all drivers multiplied by a monetary value per hour.

12. The system of claim 8, further comprising an output device configured to display the impact class graphically.

13. The system of claim 8, further comprising a processor configured to calculate at least one feature vector from the traffic-flow data.

14. A non-transitory computer-readable medium having stored thereon instructions for predicting impact of a traffic incident in a road network which when executed by a processor causes the processor to perform a method comprising:

receiving traffic data from a plurality of data-capture devices; and using a processor to:

calculate a plurality of traffic-flow velocities from the traffic data, each of the traffic-flow velocities being associated with a data-capture device and a data capture time, identify an impact type to associate with the incident region identified based on traffic data from data-capture data devices upstream of an incident, in which an impact type is divided into multiple impact classes, and use a classification scheme and a learning model to predict, based on the traffic data, an impact class associated with the traffic-flow velocities, in which an impact class indicates a degree of severity of an incident and includes a cumulative incident delay identified based on the traffic data.

15. The non-transitory computer-readable medium of claim 14, further comprising calculating a feature vector based on the traffic-flow velocities.

16. The method of claim 1, further comprising mapping an incident to an upstream sensor of the data provider.

17. The method of claim 1, in which an impact class identifies an incident duration that indicates an amount of time at which a traffic-flow velocity returns to a recurrent velocity.

18. The method of claim 1, further comprising predicting whether a report of an incident is a false alarm.

19. The method of claim 18, in which the prediction of whether a report of an incident is a false alarm is based on at least one of a difference between a measured speed and a recurrent speed, a road occupancy, and a police report.

20. The system of claim 8, in which an impact class indicates an incident delay, and in which an incident delay comprises a cumulative delay of all drivers as a result of an incident.

* * * * *